United States Patent [19]
Kervagoret

[11] Patent Number: 5,410,943
[45] Date of Patent: May 2, 1995

[54] PRESSURE REGULATION DEVICE FOR HYDRAULIC SYSTEM

[75] Inventor: Gilbert Kervagoret, Argenteuil, France

[73] Assignee: AlliedSignal Europe Services Techniques, Drancy, France

[21] Appl. No.: 50,201

[22] PCT Filed: Oct. 7, 1992

[86] PCT No.: PCT/FR92/00927
§ 371 Date: May 4, 1993
§ 102(e) Date: May 4, 1993

[87] PCT Pub. No.: WO93/09484
PCT Pub. Date: May 13, 1993

[30] Foreign Application Priority Data

Oct. 31, 1991 [FR] France ................. 91 13482

[51] Int. Cl.$^6$ .................................. F15B 13/044
[52] U.S. Cl. ......................... 91/459; 137/596.17; 137/625.65; 303/119.2
[58] Field of Search ................... 91/433, 459; 137/596.17, 625.65; 303/119.2

[56] References Cited

U.S. PATENT DOCUMENTS

| | | | |
|---|---|---|---|
| 3,880,476 | 4/1976 | Belart et al. | 303/119.2 |
| 4,744,389 | 5/1988 | Ichihashi. | |
| 5,234,030 | 8/1993 | Kervagoret et al. | 137/596.17 |
| 5,248,191 | 9/1993 | Kondo et al. | 303/117.1 |

FOREIGN PATENT DOCUMENTS

| | | |
|---|---|---|
| 0254483 | 1/1988 | European Pat. Off. . |
| 0357964 | 8/1989 | European Pat. Off. . |
| 3-276853 | 12/1991 | Japan . |
| 90/05658 | 5/1990 | WIPO . |
| 91/15388 | 10/1991 | WIPO . |

OTHER PUBLICATIONS

Fabian et al, Machine Design, pp. 59–62, Jan. 24, 1991.

Primary Examiner—Gerald A. Michalsky
Attorney, Agent, or Firm—Larry J. Palguta

[57] ABSTRACT

The invention relates to a pressure regulation device for a hydraulic system comprising at least one generator (30) of fluid under pressure, a brake actuator (28) and a reservoir (32) of fluid under low pressure, and including an electrovalve controlled by a computer, the electrovalve being connected via a duct (29) to the generator (30) of fluid under pressure and via a duct (31) to the brake actuator (28), and comprising in a casing (8) an electrical coil (10) and a sliding magnetic core (12) controlling a slide valve (16) sliding in a bore provided in a body (18), the slide valve (16) determining two chambers (22, 40) arranged on either side of the slide valve (16) and being formed with a valve (48) with ball (50) co-operating with a seating (52) formed on the casing (8), the slide valve (16) being formed with a groove (34) delimited by two bearing surfaces (36, 38). One of the bearing surfaces (36) co-operates with the duct (31) for connection with the brake actuator (28) and has a length (L) greater than the diameter (D) of that duct by a length (R) representing a functional overlap.

4 Claims, 1 Drawing Sheet

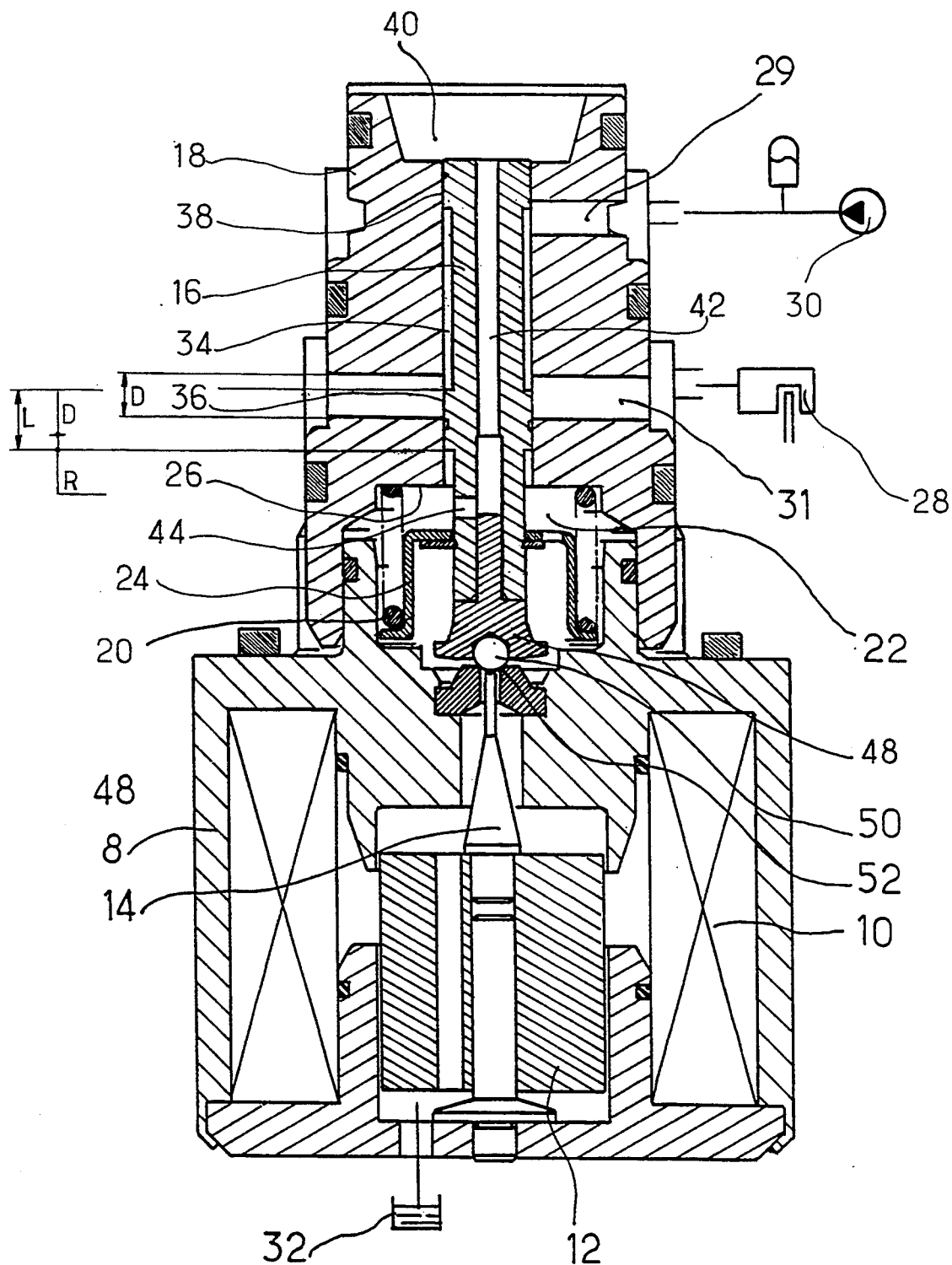

PRESSURE REGULATION DEVICE FOR HYDRAULIC SYSTEM

The invention relates to a pressure regulation device for a hydraulic system.

It is particularly suited to motor vehicle braking systems with anti-locking of the wheels during braking, and/or anti-wheelspin during acceleration. Current anti-locking systems use, between a source of fluid under pressure and a hydraulic receiver such as a brake actuator, an electrovalve controlled by a computer as a function of signals representative of the rotation of the wheels of the vehicle, in order, in a general manner, to release the pressure of the fluid in the brake actuator when the computer detects the imminence of the locking of a wheel, and then to connect a second source of fluid under pressure so as to raise the pressure once more, until the imminence of locking is detected once again, the cycle then renewing itself. Electrovalves of the same type are used in anti-wheelspin systems in order to generate a pressure in a brake actuator of a driving wheel when the computer detects a tendency of this driving wheel to spin, and then to release this pressure when the tendency to spin has disappeared.

The electrovalves used are electrovalves operating in all-or-nothing manner, one electrovalve being used in order to release the pressure, another in order to raise the pressure, and this for each wheel of the vehicle. However the periods of anti-locking or anti-wheelspin in which cycles as described above succeed one another, last for a very short time during which the electrovalve changes state a very large number of times. This causes an unpleasant noise of hammering of the movable part of the electrovalve, multiplied by the number of electrovalves.

Moreover, as the electrovalves operate in all-or-nothing manner, pressure surges appear in the brakes producing poorly controlled transient conditions.

The present invention has the object of obviating these disadvantages by using an electrovalve termed proportional producing in the user system the phases of release of pressure and of raising of pressure as a function of the current circulating in the coil of the electrovalve in a given range of displacement of the magnetic core of the electrovalve.

Anti-locking and/or anti-wheelspin braking systems using proportional electrovalves are known, moreover, for example from WO-A-91/15388 or EP-A-0,254,483, which systems lead to relatively complex and therefore costly production.

Such an anti-locking or anti-wheelspin system then has the advantage of being controllable simply by causing to vary the current circulating in a single coil per monitored wheel of the vehicle; this therefore results in a large reduction in the pressure surges in the brakes. In addition, such an electrovalve may easily be of simplified design, resulting in a simplified assembly. This, combined with a large reduction in the number of the components of an anti-locking or anti-wheelspin system, reduces considerably the cost of such a system.

The subject of the present invention is therefore a pressure regulation device for a hydraulic system comprising at least one generator of fluid under pressure, a brake actuator and a reservoir of fluid under low pressure, and including a proportional electrovalve controlled by a computer, the electrovalve being connected via a duct to the generator of fluid under pressure and via a duct to the brake actuator, and comprising in a casing an electrical coil and a sliding magnetic core controlling a slide valve determining two chambers arranged on either side of the slide valve and being formed with a valve with ball co-operating with a seating formed on the casing, the slide valve being formed with a groove delimited by two bearing surfaces, one of the bearing surfaces co-operating with the duct for connection with the hydraulic actuator and having a length greater than the diameter of that duct by a length representing a functional overlap.

The invention will now be described by way of example with reference to the accompanying drawings [sic] in which:

The single FIGURE shows diagrammatically in section an embodiment of a device according to the present invention in rest position.

It is known that the coil of electrovalves termed proportional has the essential feature of being able to supply a substantially constant force for a given current in a non-negligible range of displacement of the magnetic core, of the order of 2 to 3 mm. This feature is generally obtained owing to a geometry particularly of the polar parts [sic]. This feature is used in the present invention in order to ensure the required function by modulation of the current circulating in the coil.

In the FIGURE, such an electrovalve is seen, comprising in a casing 8 an excitation coil 10, a sliding magnetic core 12 provided with its push rod 14 bearing against a slide valve 16 sliding in a bore of a body 18. A prestressed spring 20 is arranged in a chamber 22 for example between a cup 24 integral with the slide valve 16 and a wall 26 of the body 18 so as to pull the slide valve 16 towards its rest position shown in the FIGURE.

The slide valve 16 is machined so as to be able to open or close a communication between a brake actuator 28 connected to a duct 31, a source of fluid under pressure 30 connected to a duct 29 and a reservoir 32 in accordance with hydraulic pressure regulation systems in general use. For this purpose a groove 34 is provided at the periphery of the slide valve 16, between two bearing surfaces 36 and 38, as will be seen more precisely later.

The two chambers 22 and 40 located on either side of the slide valve 16 in the bore are at the same pressure owing to a drilling opening 42 made in the slide valve 16 and opening into these two chambers. The slide valve 16 comprises on the other hand at one of its ends a valve 48 with ball 50 co-operating with a seating 52 formed on the casing 8. The ball valve 50-52 opens or closes the communication between the chamber 22 and the reservoir 32.

It will be noted that, owing to this advantageous arrangement, all of the components of the electrovalve are assembled solely by movements of axial direction, and pins and other transverse stops are no longer needed.

The functioning of the electrovalve which has just been described will now be explained. In rest position, as shown, the source of fluid under pressure 30 is in communication with the brake actuator 28 via the groove 34. The two end chambers 2 and 40 communicate with one another via the axial drilling 42 and radial drilling 44 made in the slide valve 16, and they are isolated from the reservoir 32 by the valve 50 resting on its seating 52.

When the electrovalve is energized, for example in a period of anti-locking of the wheels in the context of the preferred application of the invention, first of all the current circulating in the coil produces a force opposing that of the spring 20 in order to raise the ball 50 from its seating 52 and to open the communication between the chamber 22, and therefore the chamber 40, and the reservoir 32. The force is exerted by the push rod 14 against that of the spring 20 whatever the pressure prevailing in the hydraulic utilization system between the source of fluid under pressure 30 and the brake actuator 28, since the chambers 22 and 40 on either side of the slide valve 16 are always at the pressure of the reservoir 32.

This in particular makes it possible for the electrovalve not to have a high electrical consumption. The opening of the valve 50, 52 and the placing of the chambers 22 and 40 in communication with the reservoir 32 takes place before the current in the coil 10 reaches its nominal intensity. Then, the intensity being nominal, the slide valve 16 has been displaced sufficiently for the bearing surface 36 to come and close off completely the supply duct 31 of the brake actuator 28, which then finds itself in a position of isolation from the rest of the hydraulic system.

The bearing surface 36 of the slide valve 16 has been constructed so as to have a predetermined positive overlap, that is to say that it has a length R representing the functional overlap.

On the other hand, the electrovalve used being proportional, the force E exerted by the push rod 14 on the slide valve 16 is proportional to the intensity I of the current passing through the coil 10. When balanced, this force is equal and in opposite direction to that which is exerted by the spring 20 on the slide valve 16. This force is equal to the prestressing when resting F of the spring 20 plus the product of the stiffness K of the spring 20 by the displacement X of the slide valve 16. From this is deduced the functioning of the proportional electrovalve where to each value of the current I in the coil 10 corresponds a position of the slide valve 16.

We have seen that the invention provides for construction of the bearing surface 36 with a functional overlap so that there exists an intermediate position of the slide valve 16 for which the brake actuator 28 is in isolation phase. There exists therefore a value Im of the current I corresponding to this isolation position. When one wishes to pass to the pressure release phase in the pressure receiver 28, one increases the current circulating in the coil 10 by a predetermined value i so as to displace the slide valve 16 by a predetermined amount x at least equal to half of the functional overlap R, so that the bearing surface 36 uncovers the passage connecting the duct 31 to the chamber 22 and to the reservoir 32, the valve 50-52 being open. When one wishes to pass to the phase of admission of pressure into the brake actuator 28, one reduces the current circulating in the coil 10 by the predetermined value i so as to allow the slide valve 16 to be displaced under the action of the spring 20 by the predetermined amount x so that the bearing surface 36 uncovers the passage connecting the duct 31 to the groove 34 and to the duct 29 bringing the fluid under pressure coming from the pressure source 30.

The force to be provided by the push rod 14 in order to place the slide valve 16 into the isolation position, that is to say to place the bearing surface 36 into the position of closing off the duct 31, is known by construction.

The same therefore applies to the value Im of the current controlling this position, which may be put into the memory of the computer. In contrast, the amount x, and therefore the value i, is determinative for the cross section for passage of the fluid coming from the source 30 or towards the reservoir 32, and therefore for the slope of the curves representing the evolution of the pressure in terms of time, both for the pressure admission phase and for the pressure release phase. The value i will then be determined by the computer depending on its analysis of the speed of the wheels of the vehicle, for example in order to execute phases of moderated raising of pressure and phases of rapid pressure release, or vice versa. It may clearly be seen therefore that, according to the invention, an electrovalve has been constructed having three ways and three positions: isolation, release and admission, in which the release and admission positions can be deliberately modulated depending on the conditions of use. This electrovalve is particularly simple and reliable, and easy to assemble. It replaces on its own the two electrovalves currently used for each wheel, and in addition makes it possible to eliminate other associated components such as restrictors and non-return valves.

Although only one embodiment of the invention has been described, it is obvious that a person skilled in the art may make many modifications to it without going beyond the scope of the invention as defined by the accompanying claims.

I claim:

1. A pressure regulation device for a hydraulic system comprising at least one generator of fluid under pressure, a brake actuator and a reservoir of fluid under low pressure, and including a proportional electrovalve controlled by a computer, the electrovalve being connected via a duct to the generator of fluid under pressure and via a duct to the brake actuator, and comprising in a casing an electrical coil and a sliding magnetic core controlling a slide valve sliding in a bore provided in a body, the slide valve determining two chambers arranged on either side of the slide valve and having a valve with ball co-operating with a seating formed at the casing, the slide valve having a groove delimited by two bearing surfaces, one of the bearing surfaces co-operating with the duct for connection with the brake actuator and having a length greater than the diameter of the duct by a length representing a functional overlap.

2. The device according to claim 1, wherein the two chambers arranged on either side of the slide valve communicate with one another via an axial opening in the slide valve.

3. The device according to claim 2, wherein the slide valve is displaceable in three positions, an isolation position where the duct for connection to the brake actuator is closed off, a release position where that duct is connected to the low pressure reservoir, and an admission position where the duct is connected to the generator of fluid under pressure.

4. The device according to claim 3, characterized in that the release and admission positions are capable of modulation.

* * * * *